(12) United States Patent
Seroka

(10) Patent No.: US 7,607,908 B2
(45) Date of Patent: *Oct. 27, 2009

(54) INSERT FOR A TIRE MOLD VENT

(75) Inventor: Edward Seroka, Akron, OH (US)

(73) Assignee: Bridgestone Firestone North American Tire

( * ) Notice: Subject to any disclaimer, the term of this patent is extended or adjusted under 35 U.S.C. 154(b) by 0 days.

This patent is subject to a terminal disclaimer.

(21) Appl. No.: 12/263,636

(22) Filed: Nov. 3, 2008

(65) Prior Publication Data

US 2009/0061032 A1 Mar. 5, 2009

Related U.S. Application Data

(63) Continuation of application No. 11/745,520, filed on May 8, 2007, now Pat. No. 7,530,803.

(51) Int. Cl.
*B29C 33/10* (2006.01)

(52) U.S. Cl. ............. 425/28.1; 249/141; 425/472; 425/812

(58) Field of Classification Search ........... 425/28.1, 425/472, 812; 249/141
See application file for complete search history.

(56) References Cited

U.S. PATENT DOCUMENTS

| | | | |
|---|---|---|---|
| 3,377,662 A | 4/1968 | Fukushima | |
| 3,553,790 A | 1/1971 | Brobeck | |
| 3,989,430 A | 11/1976 | Dailey | |
| 4,021,168 A | 5/1977 | Dailey | |
| 4,026,512 A | 5/1977 | Holt | |
| 4,081,225 A | 3/1978 | Yaita | |
| 4,436,497 A | 3/1984 | Dahl | |
| 4,740,145 A | 4/1988 | Shurman | |
| 4,759,701 A | 7/1988 | Carter | |
| 4,795,331 A | 1/1989 | Cain | |
| 5,059,380 A | 10/1991 | Wise | |
| 5,283,022 A | 2/1994 | Bartley | |
| 5,356,580 A | 10/1994 | Clark | |
| 5,482,721 A | 1/1996 | Clark | |
| 5,939,101 A | 8/1999 | Green | |
| RE36,413 E | 11/1999 | Clark | |
| 5,997,783 A | 12/1999 | Hunter | |
| 6,206,336 B1 | 3/2001 | Espie | |

(Continued)

FOREIGN PATENT DOCUMENTS

JP 61235108 A 10/1986

(Continued)

OTHER PUBLICATIONS

International Search Report; International Application No. PCT/JP2006/310745; Japanese Patent Office; Jul. 18, 2006.

*Primary Examiner*—James Mackey
(74) *Attorney, Agent, or Firm*—Thomas R. Kingsbury; Steven M. Auvil

(57) ABSTRACT

An insert for a tire mold is provided. In one embodiment, the insert has an elongated cylindrical body. The insert includes at least one channel portion with a plurality of channels disposed in a non-axial direction along the surface of the insert. The at least one channel portion extends from a first end of the insert. The insert may further include a reduced diameter portion with at least one axial groove disposed thereon.

20 Claims, 7 Drawing Sheets

U.S. PATENT DOCUMENTS

| | | |
|---|---|---|
| 6,280,176 B1 | 8/2001 | Boyce |
| 6,367,765 B1 | 4/2002 | Wieder |
| 6,402,489 B1 | 6/2002 | Dyer |
| 6,561,779 B2 | 5/2003 | Nitsch |
| 6,660,216 B1 | 12/2003 | Porter |
| 6,755,483 B2 | 6/2004 | Yukawa |
| 6,808,376 B2 | 10/2004 | Serener-Thielmann |
| 6,827,569 B2 | 12/2004 | Wieder |
| 6,871,831 B1 | 3/2005 | Cuny |
| 6,877,974 B2 | 4/2005 | Puniello |
| 6,923,629 B2 | 8/2005 | Ahn |
| 7,021,914 B2 * | 4/2006 | Hanya ....................... 425/28.1 |
| 2001/0006084 A1 | 7/2001 | Yukawa |
| 2002/0100860 A1 | 8/2002 | Wieder |
| 2003/0020320 A1 | 1/2003 | Yukawa |
| 2004/0066083 A1 | 4/2004 | Tsihias |
| 2004/0206437 A1 | 10/2004 | Akiyama |
| 2007/0278707 A1 * | 12/2007 | Koberlein ................... 425/812 |

FOREIGN PATENT DOCUMENTS

| | | |
|---|---|---|
| KR | 20020037633 A | 2/1994 |
| WO | 2006129642 A | 12/2005 |

* cited by examiner

INSERT FOR A TIRE MOLD VENT

CROSS REFERENCE TO RELATED APPLICATIONS

This application is a continuation of U.S. application Ser. No. 11/745,520 filed on May 8, 2007, now U.S. Pat. No. 7,530,803, issued May 12, 2009, the disclosure of which is incorporated by reference herein in its entirety.

FIELD OF INVENTION

The present application relates to an insert for forming a vent in a mold. More particularly, the application relates to an insert having surface channels for forming a vent in a tire mold that directs airflow along a non-linear path.

BACKGROUND

During the curing cycle of a tire manufacturing process, air may become trapped between a green tire and a mold cavity when a tire molding press is closed. This trapped air can cause "lightness" in the cured tire. One known method for evacuating this trapped air is through the use of vents. Vents are added in the mold and bead rings to bleed the air during the curing process. The vents are either directly drilled through the mold or bead rings, or a hole is drilled through the mold or bead ring and a preformed insert is placed in the hole, thereby forming a vent.

During air evacuation, the elastomeric tire material may flow into the vents, creating projections on the surface of the tire known as sprues. Known prior art vents have employed smaller diameters, through the body of an insert or the mold, which still results in conspicuous sprue formation.

SUMMARY

In one embodiment of the application, an insert configured to form a vent in a tire mold includes at least one channel portion having a plurality of channels disposed in a non-axial direction along the surface of the insert. The at least one channel portion includes at least a first channel portion extending from the first axial end of the insert. The insert further includes a reduced diameter portion having a diameter smaller than that of the channel portion. The reduced diameter portion includes at least one axial groove disposed thereon. Depending on the dimensions and the number of channels and grooves on the surface of the insert, the airflow in may exceed the airflow of known prior art inserts and may result in less conspicuous sprue formation.

BRIEF DESCRIPTION OF DRAWINGS

In the accompanying drawings, inserts and tire molds are illustrated that, together with the detailed description provided below, describe exemplary embodiments of the claimed invention.

In the following drawings and description, like elements are identified with the same reference numerals. The drawings are not to scale and the proportion of certain elements may be exaggerated for the purpose of illustration.

DETAILED DESCRIPTION

Certain terminology will be used in the foregoing description for convenience in reference only and will not be limiting. The terms "forward" and "rearward" with respect to each insert will refer to direction towards and away from, respectively, the interior of a tire mold. The terms "inwardly" and "outwardly" will refer to directions toward and away from, respectively, the interior of a tire mold cavity. All foregoing terms mentioned above include the normal derivative and equivalents thereof.

Figure 1:
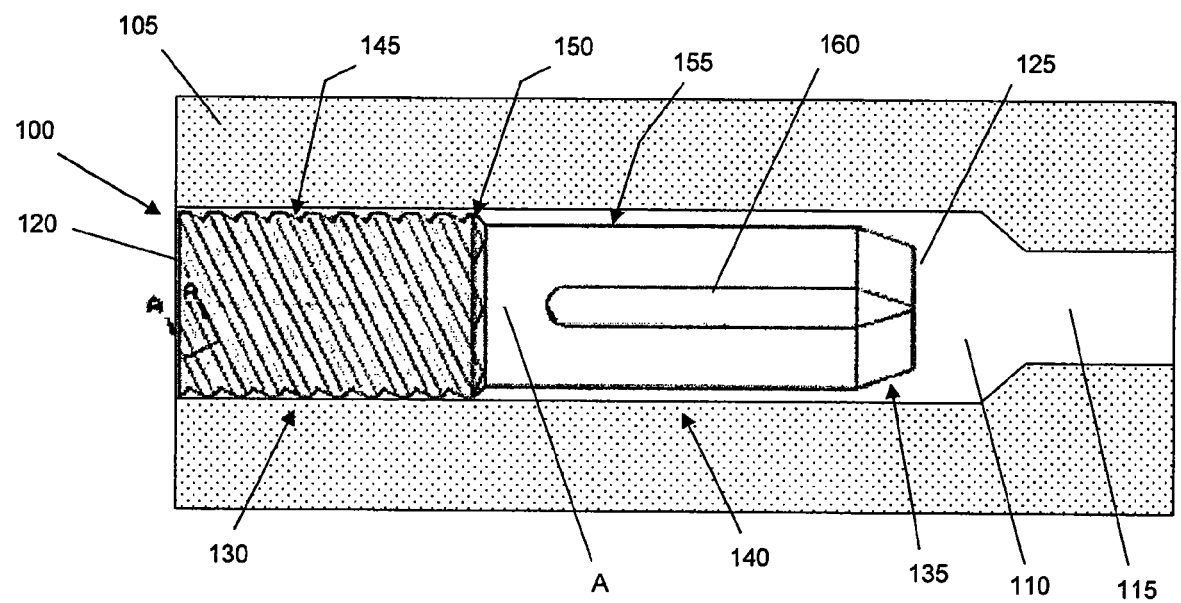
FIG. 1 illustrates a side view of one embodiment of an insert in a tire mold.

FIG. 1 illustrates a side view of one embodiment of an insert 100 for use in a tire mold 105 to form a vent. The insert is configured to be inserted in a through hole in a tire mold 105, or, as shown in the illustrated embodiment, in a counterbore 110 of a through hole 115.

In the illustrated embodiment, the insert 100 is an elongated body that is substantially cylindrical. The insert 100 includes an axis A, a first axial end 120, and a second axial end 125. The first axial end 120 of the insert 100 is configured to be disposed adjacent to an interior surface of the tire mold 105 and may be referred to as the front face of the insert 100. In one embodiment, the insert 100 is approximately 0.5 inches in length from the first axial end 120 to the second axial end 125. In alternative embodiments, the insert 100 is about 0.25 inches to about 1.25 inches in length.

In the illustrated embodiment, the insert 100 includes a channel portion 130 adjacent the first axial end 120, a tapered portion 135 adjacent the second axial end 125, and a reduced diameter portion 140 disposed between the channel portion 130 and the tapered portion 135. In an alternative embodiment, the insert does not include a tapered portion. In another alternative embodiment, the insert does not include the reduced diameter portion.

The channel portion 130 extends outwardly from the first axial end 120 of the insert 100. In one embodiment, the channel portion 130 extends approximately 0.2 inches along the axial length of the insert 100. In alternative embodiments, the channel portion 130 extends from about 0.05 inches to about 0.5 inches along the axial length of the insert 100. In an alternative embodiment (not shown), the channel portion 130 extends from the first axial end 120 to the taper 135. In one embodiment, the channel portion 130 has an outer diameter of approximately 0.125 inches. In an alternative embodiment, the channel portion has an outer diameter of about 0.060 inches to about 0.25 inches.

With continued reference to FIG. 1, the channel portion 130 includes a plurality of channels 145 disposed on the surface, thereby forming a plurality of airflow paths. In the illustrated embodiment, the plurality of channels 145 are arranged in a helical configuration around the circumference of the insert 100. In the illustrated embodiment, the channels 145 have a helical offset of about 0.031 inches per one-quarter revolution. In an alternative embodiment, the channels 145 have a helical offset of about 0.020 inches per one-quarter revolution to about 0.080 inches per one-quarter revolution. In another alternative embodiment, the channels 145 are arranged in any non-axial orientation.

Figure 2A:
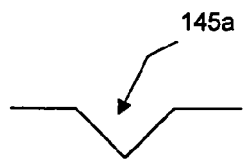
FIG. 2A illustrates a detail view of one embodiment of section A-A of the insert illustrated in FIG. 1.

FIG. 2A illustrates one embodiment of a cross-section of a channel 145a taken across-section A-A. In the illustrated embodiment, the channel 145a has a V-shaped cross-section. In one embodiment, the channel 145a has a depth of approximately 0.006 inches and a width of approximately 0.012 inches. In an alternative embodiment, the channel 145a has a depth of about 0.003 inches to about 0.017 inches. Further, in an alternative embodiment, the channel 145a has a width of about 0.006 inches to about 0.034 inches.

Figure 2B:
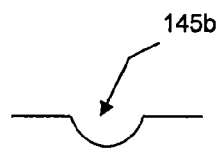
FIG. 2B illustrates a detail view of an alternative embodiment of section A-A of the insert illustrated in FIG. 1.

FIG. 2B illustrates an alternative embodiment of a cross-section of a channel 145b taken across section A-A. In the illustrated embodiment, the channel 145b has a semi-circular cross-section. In one embodiment, the channel 145b has a depth of approximately 0.004 inches and a width of approximately 0.008 inches. In an alternative embodiment, the channel has a depth of about 0.003 inches to about 0.017 inches. Further, in an alternative embodiment, the channel has a width of about 0.006 inches to about 0.034 inches.

Figure 2C:
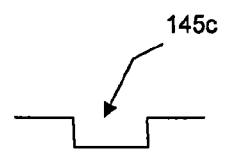
FIG. 2C illustrates a detail view of another alternative embodiment of section A-A of the insert illustrated in FIG. 1.

FIG. 2C illustrates one embodiment of a cross-section of a channel 145c taken across-section A-A. In the illustrated embodiment, the channel 145c has a rectangular cross-section. In one embodiment, the channel 145c has a depth of approximately 0.006 inches and a width of approximately 0.012 inches. In an alternative embodiment, the channel 145c has a depth of about 0.003 inches to about 0.017 inches. Further, in an alternative embodiment, the channel 145c has a width of about 0.006 inches to about 0.034 inches. In other alternative embodiments, the channel 145 has a cross-section defined by one or more curved lines and/or one or more line segments.

Figure 3:
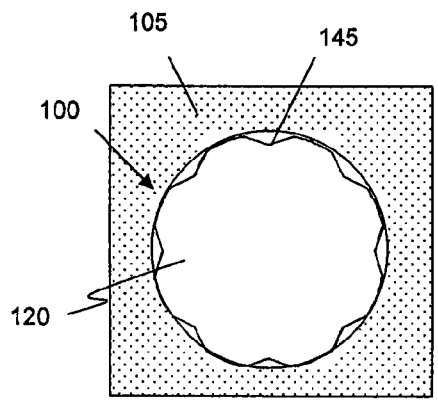
FIG. 3 illustrates a planar view of the front face of the insert illustrated in FIG. 1.

With reference now to FIG. 3, the first end, or front face, 120 of the insert 100 in the tire mold 105 is illustrated. In the illustrated embodiment, eight channels 145 are disposed on the insert 100 and the openings of the channels 145 are spaced at approximately equal intervals. In alternative embodiments, the number of channels may be varied. For example, in one embodiment, the insert may include as few as one channel 145 on the channel portion 130. Alternatively, the insert may include nine or more channels 145 on the channel portion 130. For example, in one known embodiment, the channel portion 130 includes twelve channels 145.

Figure 4A:
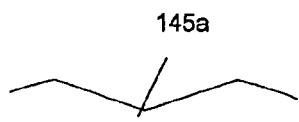
FIG. 4A illustrates a detail view of one embodiment of a channel as viewed from the face of the insert.

FIG. 4A illustrates one embodiment of a cross-section of a channel 145a as viewed from the front face 120 of the insert 100. It should be understood that because the channels 145a are angled, the opening of the channels are wider than the channel's width. In the illustrated embodiment, the channel 145a has a V-shaped cross-section having the dimensions described above in reference to FIG. 2A. In one embodiment, the opening of the channel 145a is approximately 0.027 inches wide. In an alternative embodiment, the width of the channel's opening is about 0.012 inches to about 0.05 inches.

Figure 4B:
FIG. 4B illustrates a detail view of an alternative embodiment of a channel as viewed from the face of the insert.

FIG. 4B illustrates an alternative embodiment of a cross-section of a channel 145b as viewed from the face 120 of the insert 100. In the illustrated embodiment, the channel 145b has a radial cross-section with the dimensions described above in reference to FIG. 2B. In one embodiment, the opening of the channel 145b is approximately 0.02 inches wide. In an alternative embodiment, the width of the channel's opening is about 0.012 inches to about 0.05 inches.

Figure 4C:
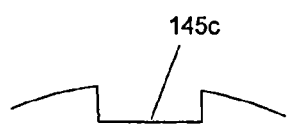
FIG. 4C illustrates a detail view of another alternative embodiment of a channel as viewed from the face of the insert.

FIG. 4C illustrates one embodiment of a cross-section of a channel 145c as viewed from the front face 120 of the insert 100. In the illustrated embodiment, the channel 145c has a rectangular cross-section having the dimensions described above in reference to FIG. 2C. In one embodiment, the opening of the channel 145c is approximately 0.027 inches wide. In an alternative embodiment, the width of the channel's opening is about 0.012 inches to about 0.05 inches.

In other alternative embodiments, the channel 145 has a cross-section defined by one or more curved lines and/or one or more line segments.

Referring back to FIG. 1, the reduced diameter portion 140 has an exterior surface 155 with a diameter smaller than the outer diameter of the channel portion 130. The channels 145 of the channel portion 130 are in communication with the reduced diameter portion 140, such that air may flow from the channels 145 and through the void between the exterior surface 155 of the reduced diameter portion 140 and the surface of the counter bore 110.

In one embodiment, the exterior surface 155 of the reduced diameter portion 140 has a diameter of about 0.110 inches. In an alternative embodiment, the reduced diameter portion 140 has a diameter of about 0.050 inches to about 0.225 inches. In one embodiment, the reduced diameter portion 140 has a length of about 0.300 inches in the axial direction of the insert 100. In alternative embodiments, the reduced diameter portion 140 has a length of about 0.05 inches to about 0.75 inches. In another alternative embodiment (not shown), the reduced diameter portion may be eliminated.

With continued reference to FIG. 1, a chamfer 150 is disposed between the channel portion 130 and the reduced diameter portion 140. In alternative embodiments (not shown), a fillet or radius is disposed between the channel portion 130 and the reduced diameter portion 140. In another alternative embodiment (not shown), there is no transition between the channel portion 130 and the reduced diameter portion 140.

In the illustrated embodiment, the reduced diameter portion 140 includes two outwardly facing axial grooves 160 disposed therein, spaced approximately 180 degrees apart, thereby providing an enlarged air passageway. The axial grooves 160 extend inwardly from the second axial end 125 of the insert 100. In one embodiment, the axial grooves 160 have lengths of about 0.25 inches in the axial direction of the insert 100. In alternative embodiments, the axial grooves 160 have lengths of about 0.05 inches to about 0.5 inches. In another alternative embodiment (not shown), the axial grooves may be eliminated. In other alternative embodiments (not shown), the reduced diameter portion includes a single axial groove, or three or more axial grooves.

In one embodiment, the axial grooves 160 have V-shaped cross-sections. In an alternative embodiment, the axial grooves 160 have semi-circular cross-sections. In other alternative embodiments, the axial grooves 160 have cross-sections defined by one or more curved lines and/or one or more line segments. In one embodiment, each axial groove 160 has a depth of 0.02 inches and a width of 0.04 inches. In an alternative embodiment, each axial groove 160 has a depth of about 0.01 inches to about 0.04 inches. Further, in an alternative embodiment, each axial groove 160 has a width of about 0.02 inches to about 0.08 inches. The depth of the axial grooves 160 may be a function of the diameter of the through hole 115. For increased airflow, a portion of the axial grooves 160 is located linearly, within the cross-sectional flow area of the through hole 115.

As discussed above, a tapered portion 135 is disposed between the reduced diameter portion 140 and the second end 125 of the insert 100. In FIG. 1, the tapered portion 135 is shown as a chamfer. In alternative embodiments (not shown), the tapered portion 135 is a fillet or radius. In another alternative embodiment (not shown), there is no transition between the reduced diameter portion 140 and the second end 125 of the insert 100.

In one embodiment, the insert 100 can be made from a variety of manufacturing processes, such as machining, extruding, or molding. If the insert 100 is machined, it may go through a light tumbling process to remove any burrs or sharp edges in the channels or grooves that may otherwise block the airflow passage. Exemplary materials for the insert 100 include aluminum, steel, other metal, thermoplastics, rubber, other polymeric materials, and other known materials.

Figure 5:
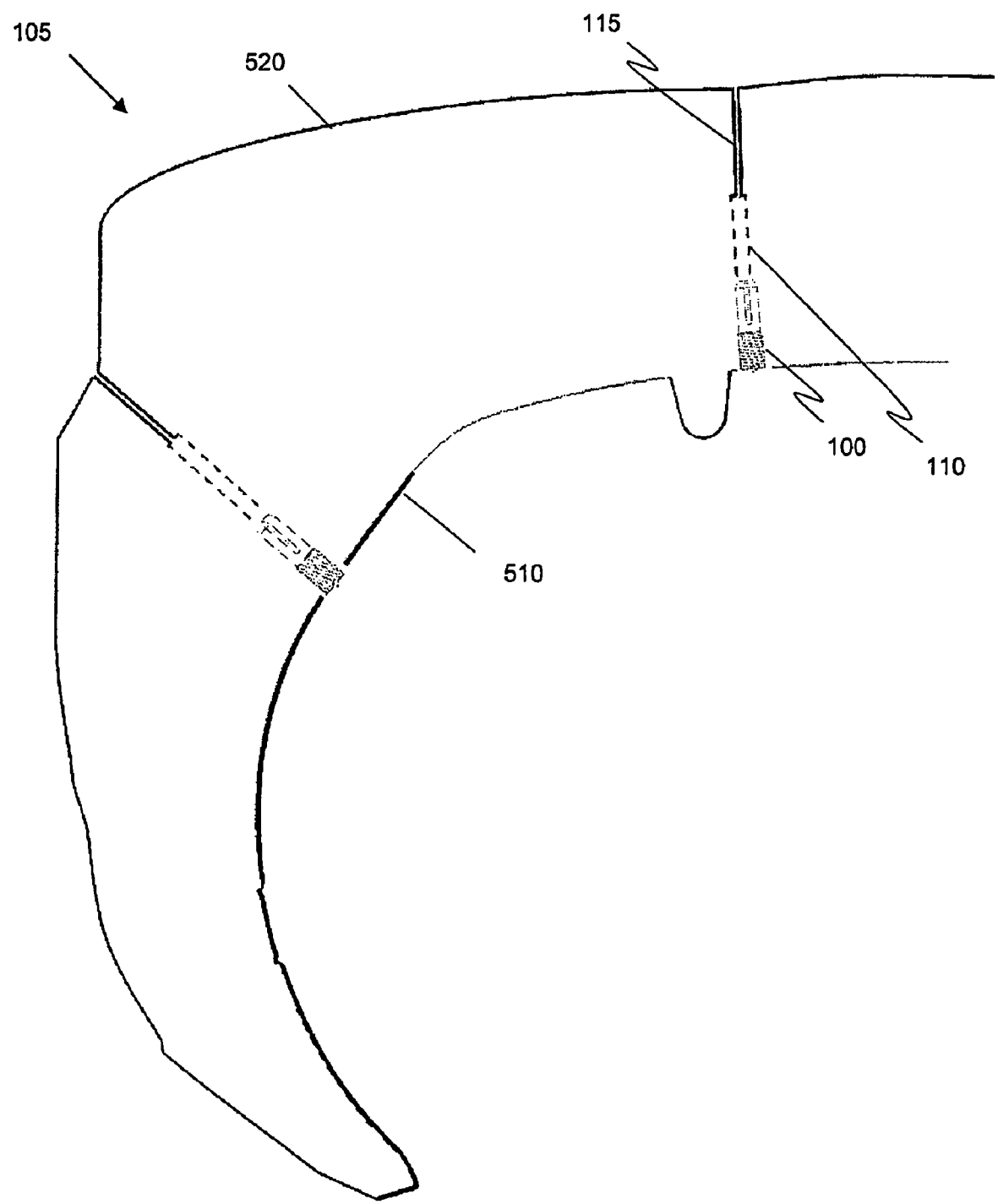
FIG. 5 illustrates a side view of a tire mold having a pair of inserts disposed therein.

FIG. 5 illustrates a side view of a portion of the exemplary tire mold 105, employing a plurality of inserts 100 described above. In the illustrated embodiment, the mold 105 includes an interior surface 510, an exterior surface 520, and a plurality of through holes 115 extending from the interior surface 510 to the exterior surface 520. In one known embodiment, the through holes have a diameter of about 0.092 inches. In other embodiments, the through holes may have diameters ranging from about 0.050 inches to about 0.25 inches.

In the illustrated embodiment, each through hole 115 includes a counter-bore 110 extending outwardly from the interior surface 510. The diameter and length of the counter-bore are dimensioned to accommodate the insert 100. In one embodiment, the diameter of the counter-bore 110 is 0.003 inches smaller than the largest diameter of the insert 100 to provide a light press fit of the insert 100. In alternative embodiments, the diameter of the counter-bore 110 is equal to or larger than the largest diameter of the insert 100. In such embodiments, the insert 100 can be held in place by one or more pins, adhesive, or other attachment means. In one known embodiment, each counter-bore 110 has a diameter of about 0.122 inches. In other embodiments, the counter-bores may have diameters ranging from about 0.060 inches to about 0.25 inches. In an alternative embodiment (not shown), the mold 105 does not include a counter-bore, and instead the through holes 115 are sized to accommodate the inserts 100.

Figure 6:
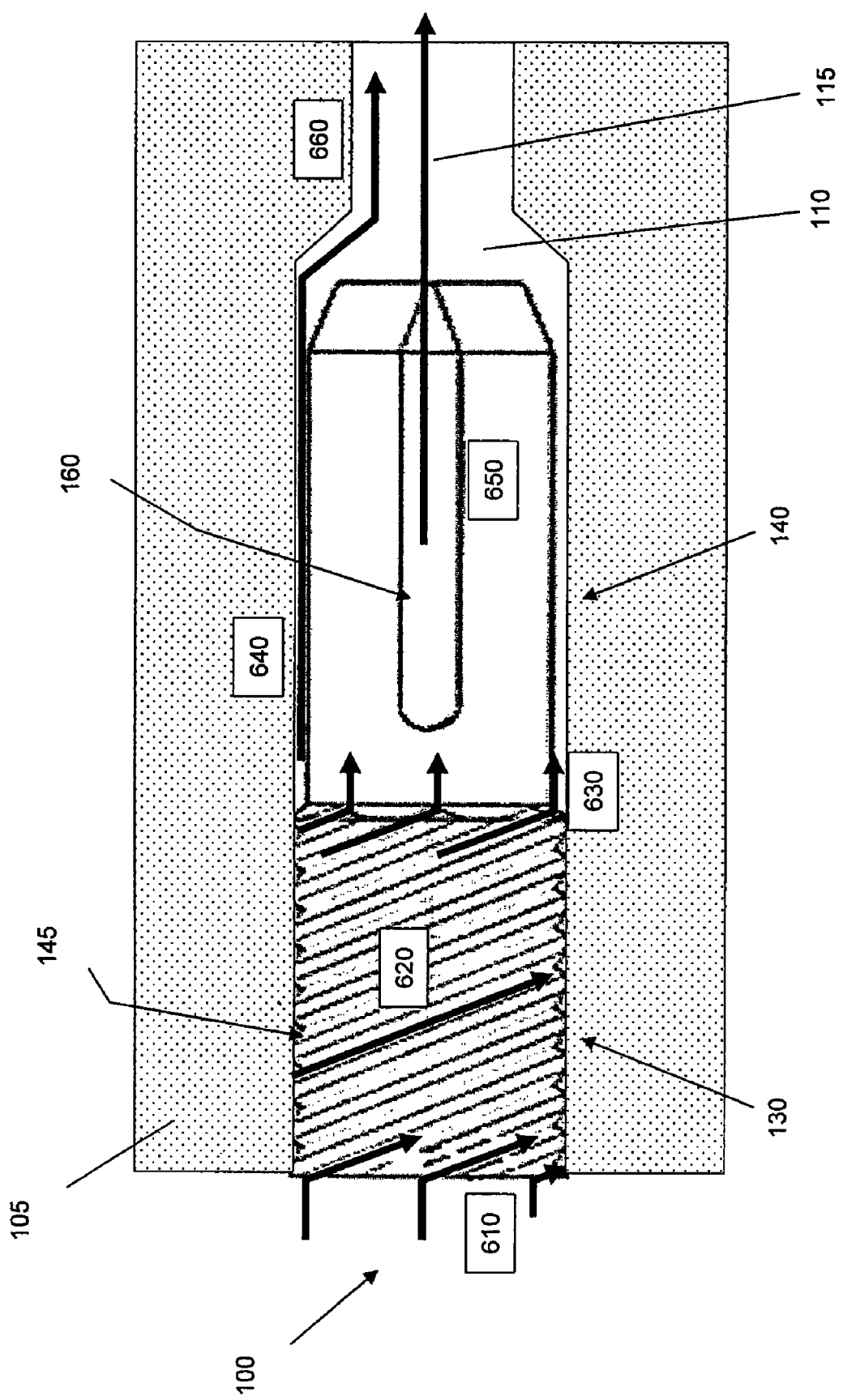
FIG. 6 illustrates a side view of the insert of FIG. 1, with arrows indicating exemplary airflow paths.

FIG. 6 illustrates a side view of the insert 100, illustrating the airflow that results from the interaction of a bladder (not shown), a green tire (not shown), and the mold 105 when a press is closing and during the curing cycle. In the illustrated embodiment, the air flows through the tire mold 105 into the openings of the channels 145 of the channel portion 130, as shown by the arrows at 610. The small size of the channels 145 in combination with their non-axial orientation causes the airflow through the channels 145 to be turbulent, thereby reducing the flow of elastomer tire material through the channels 145 and consequently reducing the size of sprues, or even eliminating sprues. After entering the openings of the channels 145, the air continues to flow along the helical path of the channels 145 as shown at 620, until it exits the channel portion 130 and flows along the reduced diameter portion 140, as shown at 640. Some of the air continues to flow along the reduced diameter portion 140, while some of the air flows through the axial grooves 160, as shown at 650. The axial grooves 160 ensure there is a clear passageway for the air and prevents pressure from building. The air then continues to flow through the counter-bore 110 and the through hole 115, as shown at 660, until it exits the mold 105.

Figure 7:
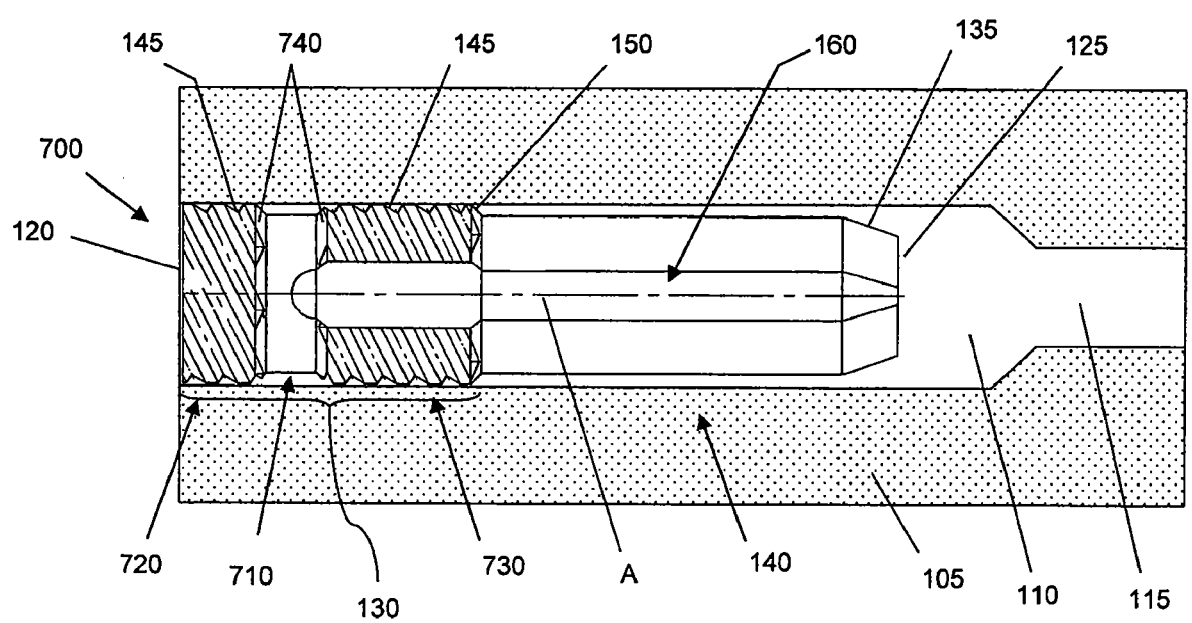
FIG. 7 illustrates a side view of an alternative embodiment of an insert having a circumferential groove.

FIG. 7 illustrates a side view of an alternative embodiment of an insert 700 for use in a tire mold 105 to form a vent. The insert 700 is configured to be inserted in a through hole in a tire mold 105, or, as shown in the illustrated embodiment, in a counter-bore 110 of a through hole 115. The insert 700 is substantially similar to the insert 100 of FIG. 1, except that (1) it includes a circumferential groove 710 disposed in the surface of the channel portion 130, thereby dividing the channel portion 130 into a first channel portion 720 and a second channel portion 730, each having a plurality of channels 145 disposed thereon, and (2) the axial groove 160 extends from the circumferential groove 710 to the second axial end 125.

In the illustrated embodiment, the channels 145 of the first channel portion 720 are in communication with the circumferential groove 710, such that air may flow from the channels 145 through the circumferential groove 710. In one embodiment, the circumferential groove 710 has a diameter of about 0.110 inches. In an alternative embodiment, the circumferential groove 710 has a diameter of about 0.050 inches to about 0.225 inches. In one embodiment, the circumferential groove 710 has a diameter equal to the diameter of the reduced diameter portion 140. In alternative embodiments, the circumferential groove 710 has a diameter greater than or less than the diameter of the reduced diameter portion 140. In one embodiment, the circumferential groove 710 has a length of about 0.05 inches in the axial direction of the insert 700. In alternative embodiments, the circumferential groove 710 has a length of about 0.01 inches to about 0.20 inches.

In the illustrated embodiment, the circumferential groove 710 includes chamfers 740 on each end. In alternative embodiments (not shown), a radius or a fillet is disposed on each end of the circumferential groove 740. In another alternative embodiment (not shown), there is no transition at the ends of the circumferential groove 740.

The first channel portion 720 extends from the first axial end 120 of the insert 700. In one embodiment, the first channel portion 720 extends approximately 0.05 inches along the axial length of the insert 700. In alternative embodiments, the first channel portion 720 extends from about 0.01 inches to about 0.20 inches along the axial length of the insert 700.

In one embodiment, the second channel portion 730 has a length of approximately 0.10 inches along the axial length of the insert 700. In alternative embodiments, the second channel portion 730 has a length of about 0.05 inches to about 1.00 inches. In other words, the second channel portion may extend to the tapered portion 135 of the insert 700, or even to the second axial end 125 of the insert 700.

In one embodiment, the first channel portion 720 has the same outer diameter as that of the second channel portion 730. In an alternative embodiment (not shown), the first channel portion 720 and the second channel portion 730 have different outer diameters.

The circumferential groove 710 is in communication with the axial grooves 160, such that air may flow from the circumferential groove 710 through the axial grooves 160. The circumferential groove 710 is included to ensure a clear airflow passage. In some instances, the rearward channels 145 of the channel portion 130 (i.e., the channels 145 of the second channel portion 730) may become closed when the insert 700 is driven into a tire mold 105 during a press fit process, but the forward channels (i.e., the channels 145 of the first channel portion 720) generally remain open and undamaged.

Figure 8:
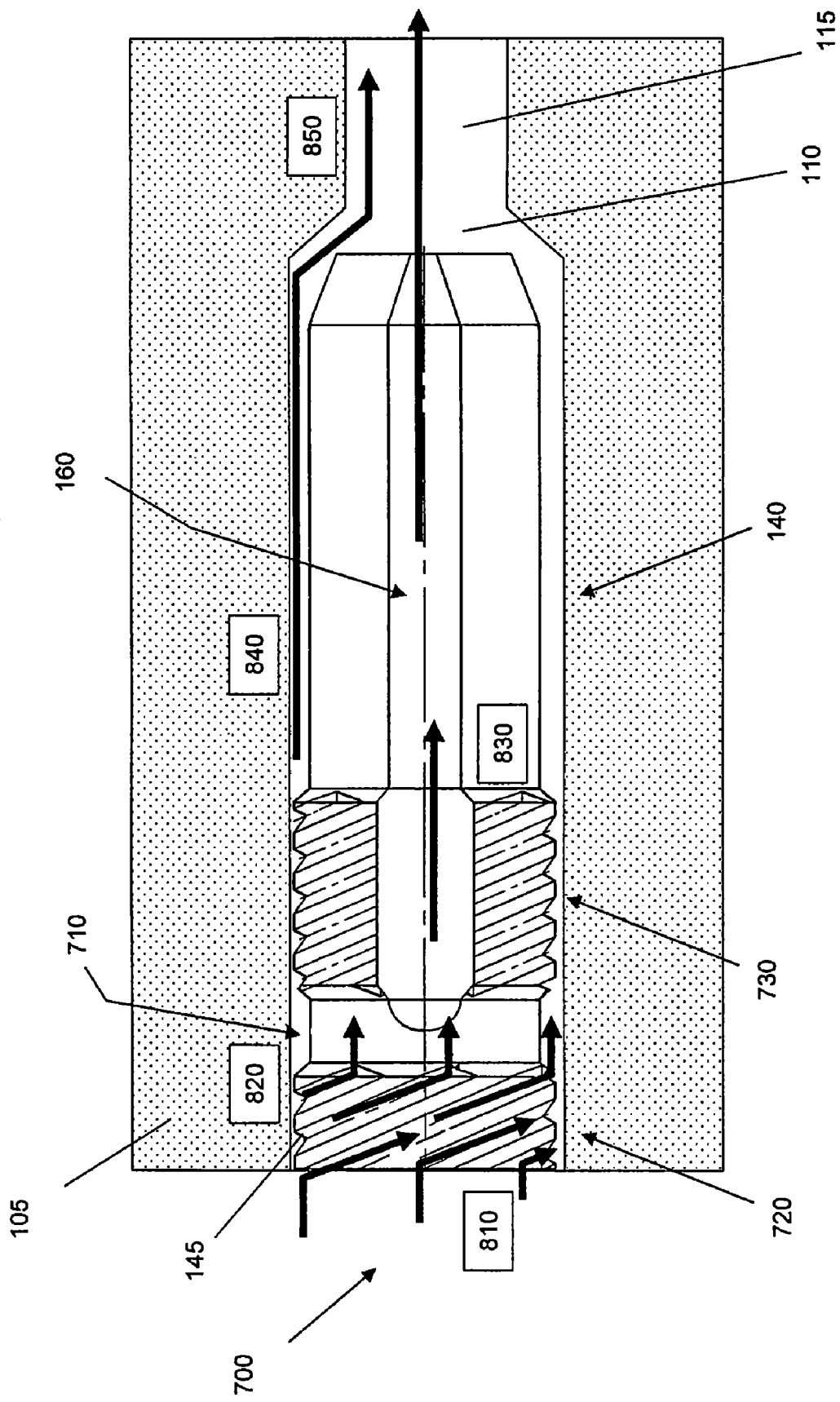
FIG. 8 illustrates a side view of the insert of FIG. 7, with arrows indicating exemplary airflow paths.

FIG. 8 illustrates a side view of the insert 700, illustrating the airflow that results from the interaction of a bladder (not shown), a green tire (not shown), and the mold 105 when a press is closing and during the curing cycle. In the illustrated embodiment, air flows through the tire mold 105 into the openings of the channels 145 of the first channel portion 720, as shown by the arrows at 810. The small size of the channels 145 in combination with their non-axial orientation causes the airflow through the channels 145 to be turbulent, thereby reducing the flow of elastomer tire material through the channels 145 and consequently reducing the size of sprues, or even eliminating sprues. After entering the openings of the channels 145, the air continues to flow along the helical path of the channels 145, until it exits the first channel portion 720 and enters the circumferential groove 710, as shown at 820. When the channels 145 of the second channel portion 730 are damaged or otherwise closed, the air flows through the axial grooves 160 as shown at 830. After passing the second channel portion 730, some of the air may flow along the outer surface 155 of the reduced diameter portion 140, as shown at 840, while the rest of the air continues to flow through the axial grooves 160. The air then flows through the counter bore 110 and the through hole 115, as shown at 850, until it exits the mold 105.

Figure 9:
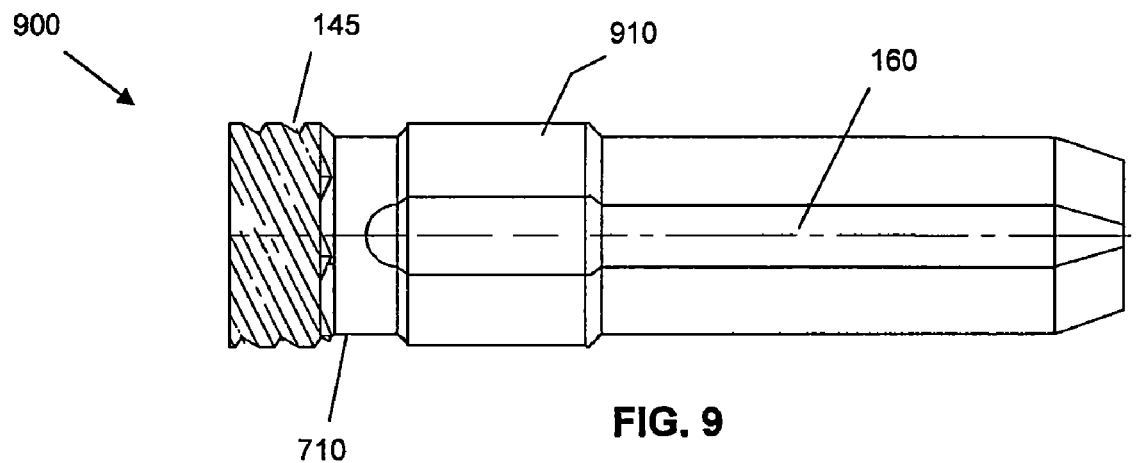
FIG. 9 illustrates a side view of another alternative embodiment of an insert having a circumferential groove and a single channel portion.

FIG. 9 illustrates another alternative embodiment of an insert 900. This embodiment is substantially the same as the insert 700 illustrated in FIG. 7, except that the second channel portion 730 is replaced with a substantially smooth, cylindrical portion 910. In this embodiment, after air flows through the channels 145 and into the circumferential groove 710, all of the air continues to flow through the axial grooves 160. In other alternative embodiments (not shown), the insert may not include a reduced diameter portion.

Figure 10:
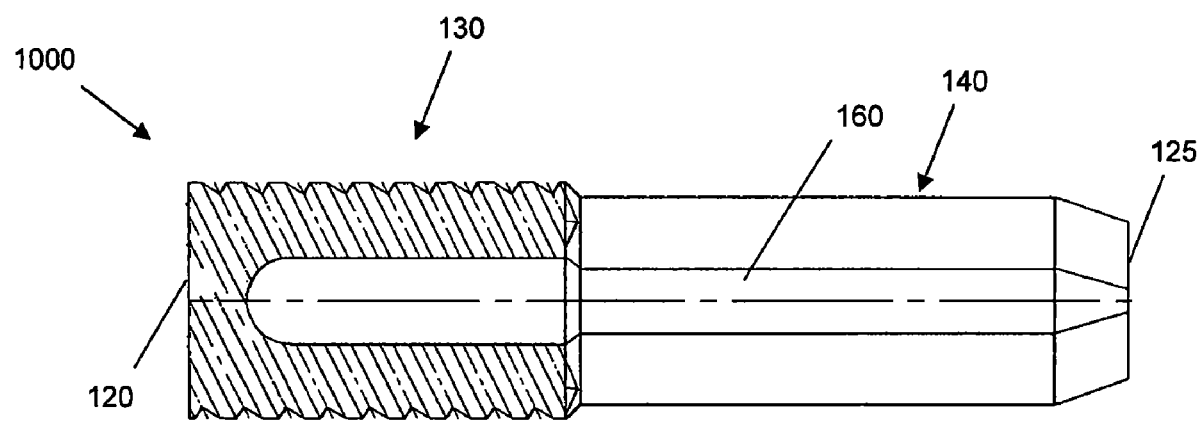
FIG. 10 illustrates a side view of another alternative embodiment of an insert having extended axial grooves.

FIG. 10 illustrates yet another alternative embodiment of an insert 1000. This embodiment is substantially the same as the insert 100 illustrated in FIG. 1, except that the axial grooves 160 extend into the channel portion 130. In one embodiment, the axial grooves 160 extend from the second axial end 125 to approximately 0.030 inches from the first axial end 120 of the insert 1000. In alternative embodiments, the axial grooves 160 extend from the second axial end 125 to about 0.010 inches to about 0.075 inches from the first axial end 120 of the insert 1000. In other alternative embodiments (not shown), the axial grooves 160 extend from the rearward end of the reduced diameter portion 140 to about 0.010 inches to about 0.075 inches from the first axial end 120 of the insert 100.

With continued reference to FIG. 10, if the rearward channels become closed during a process of press fitting the insert 1000 into a mold (not shown), air may still flow from the forward channels 145 into the axial grooves 160 and out the through holes (not shown).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. In particular, while the present application illustrates an insert used in vents for a tire mold, it should be understood that insert may be used in vents for other types of molds. For example, the above described inserts may be employed in vents of molds for other elastomeric products, such as air springs, rolled roofing, and other known elastomeric products. More broadly, the above described inserts may be employed in vents of molds for any molded products. Therefore, the application, in its broader aspects, is not limited to the specific details, the representative apparatus, and illustrative examples shown and described. Accordingly, departures may be made from such details without departing from the spirit or scope of the applicant's claimed invention.

The invention claimed is:

1. An insert for a tire mold comprising:
an elongated body having a first portion and a second portion,
the first portion of the elongated body having a plurality of channels extending in a non-axial direction to the second portion of the elongated body, and
the second portion of the elongated body having at least one axial groove.

2. The insert of claim 1, wherein the elongated body of the insert has a chamfer disposed between the first portion and the second portion.

3. The insert of claim 1, wherein the at least one axial groove extends into the first portion of the elongated body.

4. The insert of claim 1, wherein the first portion of the elongated body includes a circumferential groove dividing the first portion of the elongated body into a first channel portion and a second channel portion.

5. The insert of claim 4, wherein a diameter of the elongated body along the circumferential groove is less than or equal to a diameter of the second portion.

6. The insert of claim 4, wherein the at least one axial groove extends to the circumferential groove.

7. The insert of claim 1, wherein the plurality of channels of the first portion of the elongated body are disposed in a helical configuration.

8. The insert of claim 7, wherein the plurality of channels of the first portion of the elongated body have a helical offset of about 0.020 inches per one-quarter revolution to about 0.080 inches per one-quarter revolution.

9. A tire mold comprising:
at least one elongated through hole extending from an interior surface of the tire mold to an exterior surface of the tire mold; and
an insert disposed in the at least one elongated through hole, adjacent the interior surface of the tire mold, the insert having:
a channel portion disposed adjacent the interior surface of the tire mold and having a plurality of channels disposed in a non-axial direction, and
a reduced diameter portion spaced from the interior surface of the tire mold and having a diameter smaller than a diameter of the channel portion.

10. The tire mold of claim 9, wherein the insert further includes an axial groove disposed on the reduced diameter portion.

11. The tire mold of claim 9, wherein the insert has an outer diameter approximately equal to the diameter of the through hole.

12. The tire mold of claim 11, wherein the through hole has a diameter of about 0.050 inches to about 0.250 inches.

13. The tire mold of claim 9, wherein the through hole has a diameter of about 0.050 inches to about 0.250 inches and a counter-bore adjacent the interior surface of the mold, the counter-bore having a diameter of about 0.06 inches to about 0.25 inches.

14. The tire mold of claim 13, wherein the insert is disposed in the counter-bore and wherein an outer diameter of the insert is approximately equal to the diameter of the counter-bore.

15. The tire mold of claim 9, wherein the insert further includes an auxiliary channel portion having a plurality of channels, and a circumferential groove disposed between the channel portion and the auxiliary channel portion.

16. The tire mold of claim 15, wherein at least one axial groove extends into the auxiliary channel portion and the circumferential groove.

17. An insert for a mold comprising:
   at least two channel portions including at least a first channel portion and a second channel portion, wherein each of the first and second channel portions includes a plurality of channels disposed in a non-axial direction along the surface of the insert; and
   a circumferential groove disposed between the first channel portion and the second channel portion.

18. The insert of claim 17, wherein each of the plurality of channels has a v-shaped cross-section.

19. The insert of claim 17, wherein each of the plurality of channels has a curved cross-section.

20. The insert of claim 17, further comprising at least one axial groove.

* * * * *